(12) United States Patent
Milanowski

(10) Patent No.: US 8,024,887 B2
(45) Date of Patent: Sep. 27, 2011

(54) BAIT FISH-HOLDING TURBINE FISHING LURE

(76) Inventor: James M. Milanowski, Ridgefield, WA (US)

(*) Notice: Subject to any disclaimer, the term of this patent is extended or adjusted under 35 U.S.C. 154(b) by 63 days.

(21) Appl. No.: 11/709,545

(22) Filed: Feb. 21, 2007

(65) Prior Publication Data

US 2008/0196293 A1  Aug. 21, 2008

(51) Int. Cl.
 *A01K 85/12* (2006.01)
(52) U.S. Cl. .......................... 43/42.2; 43/44.2
(58) Field of Classification Search ............ 43/42.19, 43/42.2, 42.21, 44.2; D22/132
See application file for complete search history.

(56) References Cited

U.S. PATENT DOCUMENTS

| | | | | |
|---|---|---|---|---|
| 104,930 A * | 7/1870 | Chapman | | 43/42.2 |
| 149,123 A * | 3/1874 | Hazzard | | 43/42.2 |
| 315,967 A * | 4/1885 | Spencer | | 43/42.2 |
| 968,961 A * | 8/1910 | Lee | | 43/44.2 |
| 1,629,510 A * | 5/1927 | Klipec | | 43/42.2 |
| 2,467,971 A | 4/1949 | Frair | | |
| 2,518,593 A * | 8/1950 | Bell | | 43/44.2 |
| 2,791,059 A * | 5/1957 | Holmberg | | 43/44.2 |
| 2,804,713 A * | 9/1957 | Johnson | | 43/42.2 |
| 3,197,911 A * | 8/1965 | Rolfsness et al. | | 43/44.2 |
| 4,067,135 A * | 1/1978 | Martin | | 43/43.14 |
| 4,569,147 A * | 2/1986 | Margulis | | 43/26.2 |
| 4,703,579 A * | 11/1987 | Kay | | 43/42.19 |
| 4,848,023 A | 7/1989 | Ryder et al. | | |
| 5,063,705 A * | 11/1991 | Pool | | 43/44.6 |
| 5,303,497 A * | 4/1994 | Rabideau | | 43/42.21 |
| 5,353,540 A * | 10/1994 | Ward | | 43/42.24 |
| 5,377,442 A * | 1/1995 | Gariglio | | 43/44.4 |
| 5,505,016 A * | 4/1996 | Baron | | 43/44.2 |
| 5,893,232 A | 4/1999 | Horton et al. | | |
| 6,516,552 B2 | 2/2003 | Hawkins | | |
| 6,658,785 B1 | 12/2003 | Faulkner et al. | | |
| 7,257,923 B1 * | 8/2007 | Urbano, Jr. | | 43/44.2 |

* cited by examiner

*Primary Examiner* — Benjamin P Lee
(74) *Attorney, Agent, or Firm* — Rylander & Associates PC; Kurt M. Rylander

(57) ABSTRACT

A bait fish-holding type fishing lure having a lure body in the form of a turbine member mounted rotatably on a longitudinally-extending axle member is arranged for securement at its front end to a fishing line, the lure body turbine member formed as a substantially hollow headcap member which mounts a rearwardly-projecting bait fish body support rod arranged to support and secure a bait fish during operation of the fishing lure, the lure body turbine member including at least one peripheral, outwardly projecting, longitudinally curved turbine fin member arranged to cause rotation of the lure body and supported bait fish on a substantially consistent and steady axis of rotation on the supporting axle member upon relative movement of the lure and surrounding water during fishing operations.

14 Claims, 1 Drawing Sheet

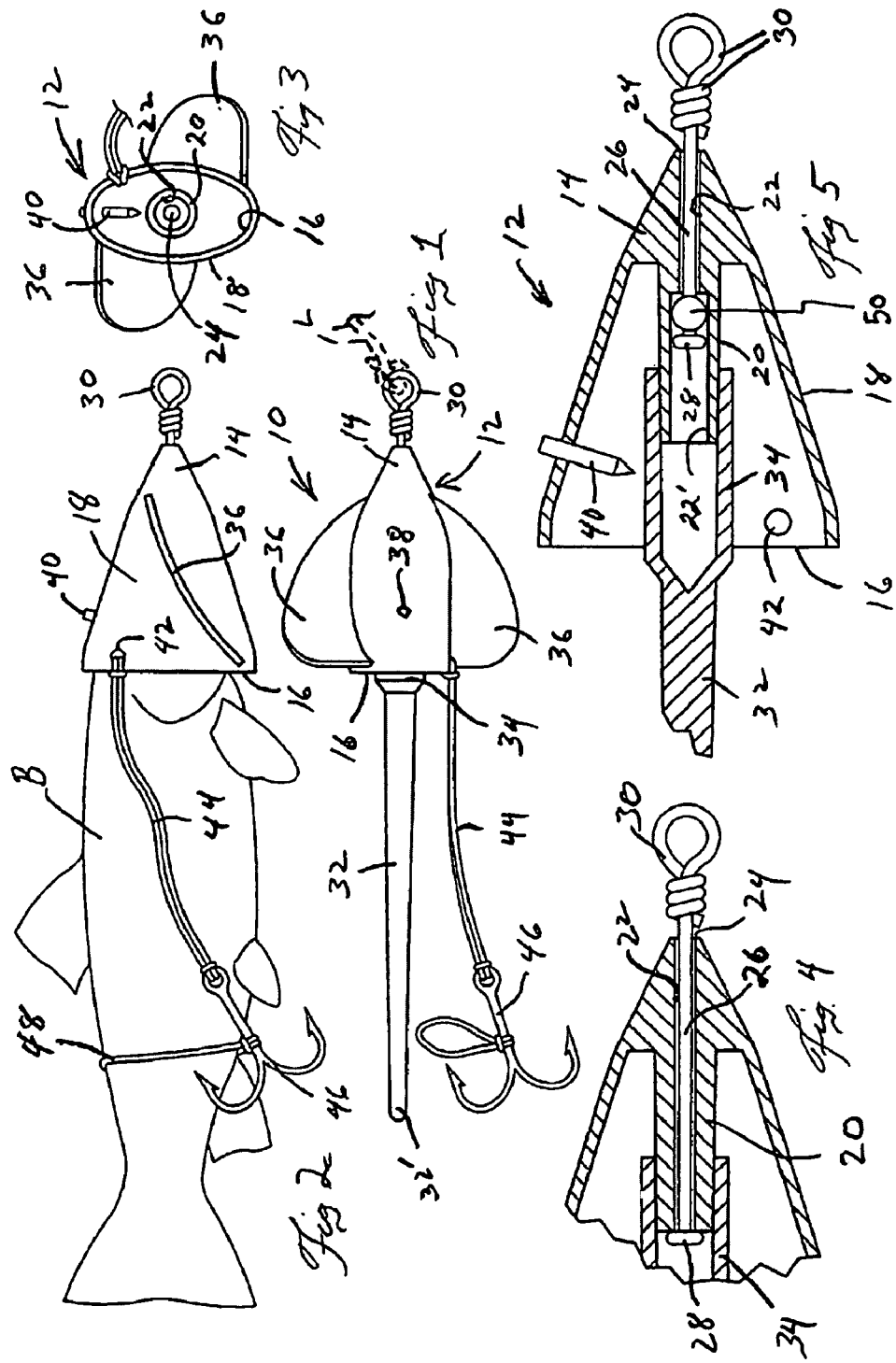

BAIT FISH-HOLDING TURBINE FISHING LURE

BACKGROUND OF THE INVENTION

This invention relates generally to fishing lures and more particularly to fishing lures arranged to hold a dead bait fish during fishing operations for attracting fish to be caught.

As is well understood by those involved in the sport fishing art, a key to success in catching fish, irrespective of the type of fishing being conducted, is the ability to attract a target fish to the proximity of the fishhook and induce the fish into biting and impaling itself on the fishhook attached to the line of the fishing pole. The fishing lure art in this regard is voluminous and replete with lures of every description arranged for the purpose of attracting the attention of fish to be caught. In most cases, lures are designed to attract the attention of fish through distinctive shapes and bright coloration, etc. usually in combination with the provision of natural and artificial bait materials, etc. placed on a fishing hook.

In this, as is also well known in the art, since many if not most types of game fish are instinctively predatory in nature and feed on smaller fish that they come across, a variety of bait fish-holding type lures have been provided heretofore that are specifically arranged to secure a substantially whole bait fish to the end of a fishing line for the impaling of a larger, target fish on a fishhook associated with the lure when the target fish strikes at the bait fish. Such lures are used in trolling, plunking, casting, stream and river current fishing, and other types of fishing in which there is a constant relative movement of the lure and surrounding water, either by the dragging of the lure through the water by trolling from a boat or through the use of the reel mechanism associated with a fishing pole, or by current movement of the water passing the lure as in stream and river current situations. It is these types of bait fish-holding lures and types of fishing to which the present invention relates.

U.S. Pat. No. 5,893,232 to Horton, et al. discloses a bait fish-holding fishing lure believed to illustrate the closest prior art bearing upon the present invention. In this, Horton provides a fishing lure having a hollow head cap end arranged to receive the head portion of a selected bait fish, the lure including a downwardly angled impaling rod fixedly secured to and projecting rearwardly from the hollow head cap. A tie line eyelet and hook line eyelet is fixedly embedded in the head cap for connection to a fish line and hook line respectively. A spoonbill type foil member is secured on the forward end portion of the head cap in order to specifically induce a wobbling movement of the lure through the water while retaining the lure and bait fish in an upright condition as is typical as spoonbill or foil-type lures in operation. This arrangement is disclosed to provide a substantially upright, wobbling movement of the bait fish lure during operation.

Another bait fish lure is disclosed in U.S. Pat. No. 6,516,552 to Hawkins which utilizes a specially-configured spoonbill foil structure protruding forwardly of the lure body arranged to replicate a natural swimming motion in operation.

U.S. Pat. No. 6,658,785 to Faulkner, et al. provides a bait fish-holding lure construction having side fin members arranged to create a stable and upright orientation of the bait fish with a lateral, side-to-side motion through the water during fishing operations.

U.S. Pat. No. 4,848,023 to Ryder, et al. also teaches a bait fish-holding type lure arranged to orient the bait fish in upright condition and deflect water during operation to create a lateral motion of the lure through the water, by provision of a bill structure protruding forwardly of the head cap member of the lure.

U.S. Pat. No. 2,467,971 to Frair also teaches a bait fish-holding type lure having a body arranged to substantially encase and hold a fish so as to leave only the tail portion exposed, the body of the lure utilizing a pivotally mounted fin member arranged to oscillate back and forth in a swimming motion and cause the body of the lure to oscillate as it is drawn through the water and thereby tend to simulate a swimming motion to attract predator fish during operation.

From the foregoing it can therefore be seen that many various different constructions and structural arrangements have been provided heretofore to produce bait fish-holding type lures that provide different, selected intended movements when drawn through the water in order to attract predator target fish to strike.

SUMMARY OF THE INVENTION

In its basic concept, this invention provides a bait fish-holding type fishing lure having a lure body in the form of a turbine member mounted rotatably on a longitudinally-extending axle member arranged for securement at its front end to a fish line, the lure body turbine member formed as a a substantially hollow headcap member mounting a rearwardly-projecting bait fish body support rod arranged to support and secure a bait fish during operation of the lure, the lure body turbine member including at least one peripherally-projecting, longitudinally-curved turbine fin member arranged to cause rotation of the lure body and supported bait fish on a substantially consistent and steady axis of rotation upon relative movement of the lure and surrounding water during fishing operations.

It is by virtue of the foregoing basic concept that the principal objective of this invention is achieved; namely, the provision of a bait fish-holding fishing lure which provides consistent rotation of the lure and supported bait fish during fishing operation to more readily attract the attention and spark the feeding instincts of predator fish to strike at the bait fish and be impaled by a fishing hook supported by the lure, and thereby overcome limitations and disadvantages of bait fish-holding fishing lures provided heretofore.

Another object and advantage of this invention is the provision of a bait fish-holding fishing lure of the class described which is arranged to be tied or otherwise secured directly to the end of a fishing line if desired without rotating or twisting the fish line by rotational operation of the lure during fishing.

Another object and advantage of this invention is the provision of a bait fish-holding fishing lure of the class described which tracks evenly and consistently through the water without lateral and vertical directional changes heretofore intended by bait fish-holding lures of the prior art which apply jerking and uneven resistance on the fishing line.

Still another object and advantage of this invention is the provision of a bait fish-holding fishing lure of the class described which provides a lure turbine body supported for rotation on a longitudinally elongated axle member which includes an axle bearing arranged to assure positive, substantially unrestricted rotation of the lure body and bait fish supported thereon during fishing operations.

A further object and advantage of this invention is the provision of a bait fish holding fishing lure of the class described which is of simplified construction for economical manufacture and reliability and durability in use.

The foregoing and other objects and advantages of the present invention will appear from the following detailed description, taken in connection with the accompanying drawings of preferred embodiments.

BRIEF DESCRIPTION OF THE DRAWINGS

FIG. 1 is a fragmentary top plan view of a fishing lure embodying features of the present invention.

FIG. 2 is a side elevational view of the fishing lure of FIG. 1 shown in condition ready for securement to the end of a fishing line for fishing operation.

FIG. 3 is a rear end elevational view of the headcap turbine member of the fishing lure.

FIG. 4 is a fragmentary sectional view through the hollow headcap member showing internal detail.

FIG. 5 is a fragmentary sectional view similar to that of FIG. 4 but showing a second, alternative axle bearing arrangement.

DESCRIPTION OF THE PREFERRED EMBODIMENT

This invention provides a substantially straight tracking bait fish-holding turbine fishing lure 10 arranged for connection to the terminal end portion of a fishing line L, the lure configured to support a dead bait fish for substantially even and consistent rotation of the lure and bait fish about an axis extending substantially parallel to the longitudinal center line of the lure and supported bait fish during relative longitudinal movement of the lure and surrounding water during fishing operations. It is by virtue of the structural arrangements now to be described in detail and shown in the illustrative embodiments in the drawings that a bait fish-holding type fishing lure is provided for consistent, substantially straight, tracking through the water behind the fish line with minimal random lateral and vertical wobbling movement while the lure and supported bait fish rotate evenly and smoothly for attracting the attention and feeding instincts of a fish to be caught.

FIG. 1 illustrates a bait fish-holding lure 10 embodying features of the present invention tied to the end of a fishing line L and shown substantially in condition to receive and secure a dead bait fish preliminary to a fishing operation. As illustrated, the lure includes a turbine body member in the form of a substantially hollow headcap member 12 having a substantially closed front end 14 and opposite, open rear end 16 and enclosing peripheral side wall 18. As is apparent, the headcap member 12 is arranged and dimensioned to contain the head portion of a selected bait fish B within its hollow interior confines, as is reflected in FIG. 2 of the drawings. In this regard, although the headcap member may be substantially round in cross section if desired, it is preferably generally oval in cross section as shown in FIG. 3 in order to more closely conform to the overall shape of the head portion of a bait fish to be confined therein. Typically, selected bait fish may include herring, sardines and anchovy, although it is to be understood that the lure of this invention may of course be proportioned at manufacture as needed to accommodate use with larger bait fish such as mullet and bonita for larger game fishing applications such as in fishing for marlin and tuna.

As seen best in FIGS. 3-5 of the drawings, the substantially hollow interior confines of the headcap member includes a longitudinally-extending, hollow axle rod support tube member 20 fixedly disposed centrally therein and arranged to extend longitudinally rearwardly from the front, closed end 14 of the headcap member. The central bore 22 extending longitudinally through the tube member 20 communicates through the closed front end 14 of the headcap member through a bore opening 24 as seen in FIGS. 3-5.

As previously mentioned, this head cap turbine body member 12 is supported for rotation on an axle member 26 which is arranged for securement at its forward terminal end to the end of the fishing line L as by tying as illustrated or alternatively through a selected connector component (not shown) as may be otherwise desired. In this regard, FIG. 4 illustrates a longitudinally-elongated axle rod member 26 having a selected diameter that is less than the diameter of the bores 22, 24 extending freely through the hollow axle rod support tube member 20 and bore through the front end 14 of the headcap member.

Means for preventing relative longitudinal displacement of the axle rod member and headcap member 12 is provided in the embodiment illustrated by an enlarged end abutment surface 28 on the rear terminal end of the axle rod 26 for abutment with the rear terminal end of the support tube 20, and at the front terminal end portion of the axle rod by the provision of an enlarged, fish line-engaging loop member 30. In this manner the headcap turbine member is securely retained on the axle member for free and unrestricted rotation. This arrangement provides a structurally simple yet rugged and reliable axle and fish line attachment arrangement as is apparent.

The axle rod support tube member 20 also provides a support mount for a longitudinally-elongated, rearwardly-extending bait fish support rod 32 arranged to extend rearwardly through the rear open end 16 of the headcap member on a line substantially along the longitudinal axis of the longitudinally-extending axle rod 26, for uniform rotation of the support rod 32 and headcap turbine member about the axis of the lure-supporting axle rod 26. In the embodiment illustrated, the bait fish support rod 32 is provided in the form of a substantially straight, generally rigid slender rod member tapering to a reduced diameter at its rearward, closed terminal end 32'. The rod member 32 is provided with an enlarged, open forward end 34 arranged with an interior opening diameter selected for frictionally engaging the exterior surface of the axle rod support tube 20 in mating, press-fit connection, as seen in FIGS. 4 and 5, whereby the bait fish support rod is securely mounted onto the headcap member. Preferably, a bonding agent or other suitable means for positively securing the members 20, 32 against inadvertent separation is provided.

As will also be appreciated in FIGS. 4 and 5, when the lure is in use and submerged, accumulation of water entering the bores 24 and 22 is confined to the interior hollow confines of the bait fish support tube 32 which hollow portion may be arranged to extend to the rear closed end 32' or may alternatively be restricted, as shown in FIG. 5, to only a predetermined forward portion thereof. In this manner, the lure may be arranged at manufacture to include a predetermined water weighting factor if so desired, but in any case is preferably arranged to prevent passage of water into the body of the bait fish with the result of undesirably overweighting the lure during operation. Additionally, it will be appreciated that water contained in the bore 22 of the axle rod support tube 20 provides a lubricating, fluid cushion bearing between the axle rod 26 and the inner walls of the bore through the support tube for improved free rotation of the lure body on the supporting axle rod.

Means is provided for rotating the lure on the supporting axle member upon relative longitudinal movement of the lure and surrounding water, either as by a positive pulling of the lure through the water by the fish line during reeling or trolling, etc. or by maintaining the lure in a consistent location in the passing current of a stream or quickly moving river. As shown in FIGS. 1-3, the headcap turbine member 12 mounts at least one, and two in the particular embodiment illustrated, longitudinally extending, longitudinally curved and tapered turbine vanes 36 or turbine fin members 36 projecting outwardly from the peripheral side wall 18. This structural arrangement effectively defines the fin-mounting headcap member of the lure as a turbine body having fins specifically configured, just like the vanes of a fluid-driven turbine, to efficiently utilize the laminar or longitudinal movement of water flowing over the fins to induce even and smooth rotation of the lure turbine body 12 on its supporting axle 26. By this turbine vane or fin arrangement, the lure is caused to rotate or spin smoothly and evenly about the center line axis of rotation of its supporting axle rod 26 as the lure moves longitudinally relative to the surrounding water. Additionally, the cutting action of the rotating turbine fins engaging the relatively moving water provides stable, consistent and even longitudinal tracking movement of the lure through the water and inhibits any tendency toward lateral and vertical distraction movements through the water.

As will be readily apparent, the selected angle, pitch, taper, length, curve, number and size of the particular fin construction is predetermined as desired and needed to accomplish desired rotational characteristics such as relative speed of rotation and weight range of bait fish that the lure is to be used with, etc.

Means is provided for positively securing a bait fish on the lure and against inadvertent separation therefrom. In the embodiment illustrated, the headcap turbine member 12 is provided with a small bore 38 through its peripheral side wall for insertion therethrough of a stake pin 40 arranged to be driven into seated engagement in the head portion of a bait fish supported on the lure as will be explained later. Thus pinned, the bait fish is positively secured in place on the support rod with its head captured within the hollow confines of the headcap, as seen in FIG. 2.

The headcap member 12 is also arranged to securely retain a fish hook positioned for impaling engagement by a target fish when striking at the bait fish. In this regard, the headcap 12 in this embodiment is provided with a second bore 42 adjacent the open rear end 16. The terminal end of a fish hook line 44 is secured to the headcap, as by utilizing the bore 42 to fixedly tie the hook line 44 to the headcap as shown. A fish hook 46 is secured to the opposite terminal end of the hook line 44 to position the hook as desired adjacent the body of the bait fish. Preferably, if allowed by local jurisdiction, the hook is a treble hook as shown to better assure that a fish is positively impaled and captured by a barb of the hook upon striking at the bait fish. Also, it is desirable that the fish hook 46 be retained in a position closely adjacent the bait fish body so that the hook is not allowed to travel outwardly and away from the bait fish during fishing operations. A simple means for retaining the hook against the body is the provision of an elastic band 48 arranged to engage the hook and encircle the body of the bait fish as shown in FIG. 2.

FIG. 5 illustrates an alternative embodiment of the axle rod tube arrangement utilizing a bearing ball 50 support between the enlarged abutment end 28 of the axle rod 26 and the support tube 20 for providing free, unrestricted rotation of the turbine body assembly on the axle rod. As shown, the rod support tube 20 in this case is provided with an enlarged internal bore portion 22' at the rearward end portion of the tube 20 and communicating with the earlier-described axle rod bore 22 extending forwardly therefrom and which in turn communicates with the bore opening 24 through the front closed end 14 of the headcap turbine member. The enlarged bore 22' accommodates reception of the bearing ball 50 arranged with the axle rod extending through a diametric bore (not shown) through the bearing ball as is apparent in the drawing. So arranged, the bearing ball thus provides a reduced friction bearing surface of engagement between the abutment surface 28 of the axle rod and the support ledge surface of the tube member 20 at the juncture of the large and small bores 22', 22 respectively. This axle bearing arrangement well assures free, unrestricted rotation capability of the turbine fishing lure body under the weight tension applied against it by the bait fish and the resistance tension supplied by the pull of the fish line during fishing operations.

Those skilled in the art will readily recognize that although a substantially rigid, metal axle rod member 26 has been illustrated herein as a preferred type of turbine-supporting axle member, other, alternative axle arrangements may be provided if desired or needed. For example, the axle rod member 26 may if desired, alternatively comprise a length of flexible fish line arranged for engagement either directly or through appropriate conventional connector, to a fishing line and extending rearwardly through the front bore opening 24 and central bore 22 in the tube member 20 of the turbine member. In this case, the fish line axle member may if desired extend freely rearwardly into the hollow interior confines of the turbine headcap member through a bore (not shown) provided, for rearward extension of a length of the fish line alongside the head and body of a bait fish secured on the support rod and headcap member. The rearmost end of the fish line may then if desired be utilized to engage a fish hook 46 similarly to the fish hook line 44 in the illustrated embodiment of FIG. 2. Other types and forms and arrangements of axle member suitable for the purpose may of course be utilized as alternatives as desired for simplicity of manufacture, cost and other objectives.

For operation of the fishing lure thus described, the lure is connected to the end of a fishing line as by tying the fish line to the loop on the forward end of the axle rod or by use of a conventional connector member well known in the fishing art. The bait fish support rod 32 is then directed into the mouth of a dead bait fish and the bait fish moved forwardly so as to seat its head portion within the hollow confines of the headcap turbine member 12. A stake pin 40 is inserted through the stake pin bore 38 and pressed into the head portion of the dead bait fish to secure the bait fish positively against inadvertent rearward separation movement, and the lure is ready for use in any desired conventional fishing operation well known to those skilled in the art.

As water moves past the headcap turbine member of the lure, the force of the water's movement over the fins causes the fins to effect rotational movement of the headcap turbine member, bait fish support rod and bait fish supported thereon to rotate about the axis of the longitudinally extending axle rod member 26 which is in turn secured at its front end to the fish line. By virtue of the turbine operation of the fins in the fluid medium, the rotation of the lure in the water is substantially even and without substantial lateral or vertical deviation, the rotating bait fish attracting the attention of potential target fish in the hope that the fish will strike at the bait fish and in so doing impale itself on the barbs of the fish hook 46. The headcap member may if desired include selected colorations and decorations as may be desired to increase the potential attractiveness of the lure to potential target fish, as is well understood in the fishing industry.

From the foregoing it will be apparent to those skilled in the art that various changes other than those already discussed may be made to the size, shape, type, number and arrangement of parts described hereinbefore without departing from the spirit of this invention and the scope of the appended claims.

Having thus described my invention and the manner in which it may be used, I claim:

1. A bait fish-holding turbine fishing lure for connection to the end of a fishing line for rotation of the fishing lure and bait fish supported thereon upon relative movement of the lure and surrounding water during fishing operations, the fishing lure comprising:
   a) a longitudinal axle member having longitudinally opposite front and rear terminal ends, the front terminal end arranged for connection to a fishing line,
   b) a lure body turbine member supported on said axle member for substantially free rotation about an axis of rotation extending along said longitudinal axle member and the fishing line, the lure body turbine member substantially rigidly mounting a rearwardly-projecting rigid, bait fish support rod member extending substantially along the axis of rotation of the turbine member on said axle member,
   c) at least one peripheral, outwardly-projecting turbine fin member on said lure body turbine member configured to utilize the longitudinal movement of water flowing over the fin member during fishing operation to rotate the lure body turbine member and a bait fish supported on said rearwardly-projecting rigid bait fish support rod member smoothly and evenly on said axle member, and
   d) means for securing a fishhook to the lure body turbine member for disposition of a secured fishhook adjacent a side of a bait fish supported on said rearwardly-projecting rigid bait fish support rod member during fishing operation.

2. The turbine fishing lure of claim 1 wherein said lure body turbine member is formed as a substantially hollow headcap member arranged to receive within its hollow confines a portion of the head of a bait fish supported on said bait fish support rod member.

3. The turbine fishing lure of claim 2 wherein said lure body turbine member mounts a plurality of said peripheral, outwardly-projecting turbine fin members spaced circumferentially about the turbine member.

4. The turbine fishing lure of claim 3 wherein each of said plurality of turbine fin members is configured as a longitudinally elongated, longitudinally curved fin member arranged to efficiently utilize the longitudinal movement of water over the surface of the turbine fin member to rotate the lure body turbine member on the axle member in a substantially uniform direction behind a fish line during fishing operation.

5. The turbine fishing lure of claim 1 wherein each of said at least one turbine fin members is configured as a longitudinally elongated, longitudinally curved fin member arranged to efficiently utilize the longitudinal movement of water over the surface of the fin member to rotate the lure body turbine member on the axle member in a substantially uniform direction behind a fish line during fishing operations.

6. The turbine fishing lure of claim 1 including a bearing member interengaging said axle member and said lure body turbine member and arranged to provide substantially free rotation of the turbine member on said axle member during fishing operations.

7. The turbine fishing lure of claim 1 including securing means for releasably interengaging the lure body turbine member and a bait fish supported on said rearwardly-projecting rigid bait fish support rod member to releasably secure the bait fish against inadvertent separation from the lure during fishing operations.

8. The turbine fishing lure of claim 7 wherein said securing means comprises a stake pin removably interengaging the lure body turbine member and a bait fish supported on said rearwardly-projecting rigid bait fish support rod member.

9. A fishing lure comprising:
   a longitudinal axis member to couple to a fishing line and to define a rotation axis substantially along the fishing line;
   a lure body formed as a substantially hollow headcap including one or more fin members, the lure body supported by the longitudinal axis member and substantially freely rotatable thereon about the rotation axis; and
   a substantially rigid bait fish support rod member rigidly coupled to and extending from the lure body to detachably engage and rotate a bait fish;
   a fish hook coupled to the lure body and rotatable therewith;
   the lure body, the substantially rigid bait fish support rod, the fish hook, and the bait fish coupled to the substantially rigid bait fish support rod to rotate about the rotation axis substantially without lateral or vertical deflection or wobbling.

10. The fishing lure of claim 9 wherein the fin members are formed at an angle relative to the longitudinal axis member to rotate the lure body and the baitfish.

11. The fishing lure of claim 9 further comprising a bearing member coupled to the longitudinal axis member to interface with the lure body supported by the longitudinal axis member.

12. The fishing lure of claim 9 further comprising a stake pin to protrude through a stake pin bore formed in the hollow headcap of the lure body to detachably engage the bait fish.

13. The fishing lure of claim 9 wherein the substantially rigid bait fish support rod member and the lure body are integrally formed.

14. The fishing lure of claim 9, the lure body, the substantially rigid bait fish support rod, the fish hook, and the bait fish coupled to the substantially rigid bait fish support rod to further rotate about the rotation axis substantially without lateral or vertical deflection or wobbling as the fishing lure is operated in water.

* * * * *